United States Patent
Yamato et al.

(10) Patent No.: US 8,158,741 B2
(45) Date of Patent: Apr. 17, 2012

(54) COMPOSITION FOR POLYURETHANE RESIN FORMATION, SEALING MATERIAL, AND HOLLOW-FIBER MEMBRANE MODULE

(75) Inventors: Kouji Yamato, Yokohama (JP); Shyogo Itoh, Yokohama (JP); Keiko Yoshida, Yokohama (JP)

(73) Assignee: Nippon Polyurethane Industry Co., Ltd., Tokyo (JP)

( * ) Notice: Subject to any disclaimer, the term of this patent is extended or adjusted under 35 U.S.C. 154(b) by 963 days.

(21) Appl. No.: 12/159,242

(22) PCT Filed: Nov. 22, 2006

(86) PCT No.: PCT/JP2006/323350
§ 371 (c)(1),
(2), (4) Date: Jun. 26, 2008

(87) PCT Pub. No.: WO2007/074597
PCT Pub. Date: Jul. 5, 2007

(65) Prior Publication Data
US 2010/0170843 A1 Jul. 8, 2010

(30) Foreign Application Priority Data
Dec. 27, 2005 (JP) ................. 2005-375767

(51) Int. Cl.
C08G 18/10 (2006.01)
C08G 18/30 (2006.01)
C08G 18/32 (2006.01)
C08G 18/66 (2006.01)
B01D 63/00 (2006.01)
B01D 63/02 (2006.01)

(52) U.S. Cl. .................. 528/77; 210/321.6; 210/500.21; 210/500.23; 521/170; 528/59; 528/60; 528/61; 528/76

(58) Field of Classification Search .............. 528/59–61, 528/75; 524/356, 43, 426, 864; 106/33; 523/438; 210/321.6, 500.21, 500.23
See application file for complete search history.

(56) References Cited

FOREIGN PATENT DOCUMENTS

| DE | 28 13 197 A1 | 10/1979 |
|---|---|---|
| EP | 1 088 839 A1 | 4/2001 |
| EP | 1 803 756 A1 | 7/2007 |
| JP | 56-145916 A | 11/1981 |
| JP | 58-93716 A | 6/1983 |
| JP | 06-100649 A | 4/1994 |
| JP | 09-048835 A | 2/1997 |
| JP | 2000-128952 A | 5/2000 |
| JP | 2002-128858 A | 5/2002 |
| JP | 2005-89491 A | 4/2005 |
| WO | 2006/035632 A1 | 4/2006 |

OTHER PUBLICATIONS

Supplementary European Search Report dated Aug. 4, 2009.

*Primary Examiner* — John Kim
(74) *Attorney, Agent, or Firm* — Sughrue Mion, PLLC

(57) ABSTRACT

A polyurethane resin forming composition comprising: a main agent (A) containing an isocyanate group-terminated prepolymer obtained by reacting an isocyanate group-containing compound (a1) with a polyfunctional polyether polyol (b1) having a specific molecular weight distribution obtained by the use of a compound having a functional group number of 8 as an initiator; and a curing agent (B) containing a castor oil-modified polyol (b2) obtained from castor oil and/or a castor oil fatty acid and a trimethylolalkane. This polyurethane resin forming composition is applicable to the production of large-sized hollow-fiber membrane modules and can form cured resins excellent in adhesion property and heat resistance, low in the temperature dependence of hardness and extremely small in the amount of substance eluted into water when immersed in the water.

9 Claims, 1 Drawing Sheet

COMPOSITION FOR POLYURETHANE RESIN FORMATION, SEALING MATERIAL, AND HOLLOW-FIBER MEMBRANE MODULE

TECHNICAL FIELD

The present invention relates to a polyurethane resin forming composition, a sealing material, and a hollow-fiber membrane module. More particularly, it relates to a polyurethane resin forming composition, which can form cured resins excellent in adhesion property and heat resistance, low in the temperature dependence of hardness, and extremely small in the amount of substance eluted when immersed in water, a sealing material obtained by curing the composition, and a hollow-fiber membrane module formed by sealing gaps between hollow-fiber membranes at an end portion of a bundle of a plurality of the hollow-fiber membranes with the sealing material.

BACKGROUND ART

In general, it is widely known to use polyurethane resins excellent in flexibility at ordinary temperature, adhesion property and chemical resistance as sealing materials for hollow-fiber membrane modules (hollow-fiber membrane type filter devices) constituting blood processors, water purifiers or industrial water treatment apparatus.

In recent years, based on a background of a demand for more improvement in throughput capacity, there is a tendency that the hollow-fiber membrane module is enlarged day by day particularly in industrial water treatment apparatus. Therefore, it has also been required that a sealing material used can meet the demand for the enlargement of the hollow-fiber membrane module.

As a composition for obtaining a sealing material for a membrane module constituting a blood processor or water purifier, there has heretofore been proposed a polyurethane resin forming composition using an amine type polyol as a component of a curing agent (see, for example, Patent Document 1).

However, the polyurethane resin forming composition cannot be applied to production of a large-sized hollow-fiber membrane module because curing rate is too high. Therefore, the composition is insufficient to be put to practical use particularly in industrial water treatment apparatus.

As a composition for obtaining a sealing material for membrane modules constituting a blood processor or water purifier, there has also been proposed a polyurethane resin forming composition making combined use of an amine type polyol and a polyoxyalkylene compound having a specific active hydrogen-containing group as components of a curing agent (see, for example, Patent Document 2).

However, a sealing material obtained from the polyurethane resin forming composition is poor in heat resistance and large in the amount of substance eluted into water when immersed in the water. Therefore, the composition is insufficient to be put to practical use particularly in industrial water treatment apparatus.

Moreover, as a composition for obtaining a sealing material for a hollow-fiber membrane module, there has been proposed a polyurethane resin forming composition using a polyether polyol having a nominal functional group number of 6 or more as a component of a curing agent (see, for example, Patent Document 3).

However, a sealing material obtained from the polyurethane resin forming composition is large in the amount of substance eluted into water when immersed in the water. Therefore, the composition is insufficient to be put to practical use particularly in industrial water treatment apparatus.

Furthermore, as a composition for obtaining a sealing material for membrane modules, there has been proposed a polyurethane resin forming composition using a prepolymer obtained from an excess amount of an organic polyisocyanate and an alkylene (having 2 to 5 carbon atoms) glycol having at least one methyl group at a side chain as a component of a main agent (see, for example, Patent Document 4).

However, a sealing material obtained from the polyurethane resin forming composition is poor in heat resistance. Therefore, the composition is insufficient to be put to practical use particularly in industrial water treatment apparatus.

In addition, as a polyurethane resin forming composition for a membrane sealing material, there has been proposed a composition composed of an isocyanate component (a main agent) and a polyol component (a curing agent) and using a caster oil-modified polyol obtained from castor oil and/or a castor oil fatty acid and a trimethylolalkane as a polyol component (see, for example, Patent Document 5).

However, a sealing material obtained from the polyurethane resin forming composition shows a high temperature dependency of hardness and thus does not result in a sufficient hardness under a high-temperature environment. Therefore, further improvement is desired particularly in industrial water treatment apparatus.

As described above, all the sealing materials obtained from the conventionally known polyurethane resin forming compositions are insufficient to be put to practical use in industrial water treatment apparatus constituted by large-sized hollow-fiber membrane modules, and there is thus a strong demand for providing a sealing material (a polyurethane resin forming composition for obtaining such a sealing material) capable of being put to practical use in such applications.

Patent Document 1: JP-A-6-100649 (pp. 2-4)
Patent Document 2: JP-A-2000-128952 (pp. 2-4)
Patent Document 3: JP-A-2002-128858 (pp. 2-5)
Patent Document 4: JP-A-9-48835 (pp. 2-4)
Patent Document 5: JP-A-2005-89491

DISCLOSURE OF THE INVENTION

Problems to be Solved by the Invention

The present invention has been made based on the aforementioned background.

A first object of the invention is to provide a polyurethane resin forming composition, which is applicable to the production of large-sized hollow-fiber membrane modules and can form cured resins excellent in adhesion property and heat resistance, low in the temperature dependence of hardness and extremely small in the amount of substance eluted into water when immersed in the water.

A second object of the invention is to provide a sealing material composed of a cured resin, which can be applied to large-sized hollow-fiber membrane modules, and are excellent in adhesion property and heat resistance, low in the temperature dependence of hardness and extremely small in the amount of substance eluted into water when immersed in the water.

A third object of the present invention is to provide a hollow-fiber membrane module excellent in productivity and durability, wherein gaps between hollow-fiber membranes at an end portion of a bundle of a plurality of hollow-fiber membranes are sealed with a sealing material composed of a cured resin, which is excellent in adhesion property and heat resistance, low in the temperature dependence of hardness and extremely small in the amount of substance eluted into water when immersed in the water.

Means for Solving the Problems

The polyurethane resin forming composition of the invention (first invention) is a polyurethane resin forming composition comprising a main agent (A) containing an isocyanate component and a curing agent (B) containing a polyol component:

which contains, as the isocyanate component constituting the main agent (A), an isocyanate group-terminated prepolymer obtained by reacting an isocyanate group-containing compound (a1) with a polyfunctional polyether polyol (b1) which is obtained by the use of a compound having a functional group number of 8 as an initiator and wherein, in molecular weight distribution in terms of polypropylene polyol measured by GPC, a main peak having a peak top in the region of a molecular weight of 600 to 900 and accounting for 75 PA % or more of total peak area (a ratio "%" regarding peak area ratio is described as "PA %") is present and a ratio (Mw/Mn) of weight-average molecular weight (Mw) to number-average molecular weight (Mn) is 1.3 or less; and which contains, as the polyol component constituting the curing agent (B), a castor oil-modified polyol (b2) obtained from castor oil and/or a castor oil fatty acid and a trimethylolalkane.

The polyurethane resin forming composition of the invention (second invention) is a polyurethane resin forming composition comprising comprises a main agent (A) containing an isocyanate component, and a curing agent (B) containing a polyol component:

which contains, as the isocyanate component constituting the main agent (A), an isocyanate group-terminated prepolymer obtained by reacting an isocyanate group-containing compound (a1)

with a polyfunctional polyether polyol (b1) which is obtained by the use of a compound having a functional group number of 8 as an initiator and wherein, in molecular weight distribution in terms of polypropylene polyol measured by GPC, a main peak having a peak top in the region of a molecular weight of 600 to 900 and accounting for 75 PA % or more of total peak area is present and a ratio (Mw/Mn) of weight-average molecular weight (Mw) to number-average molecular weight (Mn) is 1.3 or less and a polyol (b3) other than the polyfunctional polyether polyol (b1); and which contains, as the polyol component constituting the curing agent (B), a castor oil-modified polyol (b2) obtained from castor oil and/or a castor oil fatty acid and a trimethylolalkane.

In the polyurethane resin forming composition of the second invention, the polyol (b3) used for obtaining the above isocyanate group-terminated prepolymer is preferably the castor oil-modified polyol (b2).

In the polyurethane resin forming composition of the invention (the first invention and the second invention), the above isocyanate group-containing compound (a1) is preferably obtained by subjecting diphenylmethane diisocyanate or a part thereof to carbodiimide modification.

Moreover, the polyfunctional polyether polyol (b1) is preferably obtained by adding propylene oxide using sucrose as an initiator.

Furthermore, a main peak accounting for 85 PA % or more of the total peak area is preferably present in molecular weight distribution of the polyfunctional polyether polyol (b1).

The sealing material of the invention is obtained by curing the polyurethane resin forming composition of the invention.

The sealing material of the invention is suitable as a sealing material for hollow-fiber membrane modules.

The hollow-fiber membrane module of the invention is a hollow-fiber membrane module wherein gaps between hollow-fiber membranes at an end portion of a bundle of a plurality of the hollow-fiber membranes are sealed with the sealing material of the invention.

Advantages of the Invention (1) According to the polyurethane resin forming composition of the present invention, there can be formed a cured resin excellent in adhesion property and heat resistance, low in the temperature dependence of hardness (little in change of hardness by the temperature in a wide temperature range) and extremely small in the amount of substance eluted into water when immersed in the water (extremely excellent in low eluted substance property).

(2) The sealing material of the invention is excellent in adhesion property, so that high adhesive force is gained between the sealing material and a housing base material of a filter device, and also an end portion of a bundle of a plurality of hollow-fiber membranes can be strongly bound.

The sealing material of the invention is excellent in heat resistance, so that the adhesive force to the base material can be retained at a high level even when they are subjected to a steam sterilization treatment.

The sealing material of the invention is low in the temperature dependence of hardness, so that sealing performance can be surely secured in a wide temperature range.

Even when the sealing material of the invention is brought into contact with water, an amount of substance eluted into the water is extremely little.

(3) The hollow-fiber membrane module of the invention has excellent performance as a filter device and is also excellent in productivity and durability. Moreover, it is possible to enlarge the hollow-fiber membrane module so as to constitute a large-sized industrial water treatment apparatus.

BEST MODE FOR CARRYING OUT THE INVENTION

The following will explain the present invention in more detail.

<Polyurethane Resin Forming Composition>

The composition of the invention comprises a main agent (A) containing an isocyanate component and a curing agent (B) containing a polyol component.

<Main Agent (A)>

The main agent (A) of the composition of the invention contains, as the isocyanate component, at least one prepolymer having an isocyanate group at a terminal thereof, which is selected from:

(1) an isocyanate group-terminated prepolymer (hereinafter also referred to as "isocyanate group-terminated prepolymer [I]") obtained by reacting an isocyanate group-containing compound (a1) with a polyfunctional polyether polyol (b1); and (2) an isocyanate group-terminated prepolymer (hereinafter also referred to as "isocyanate group-terminated prepolymer

[II]") obtained by reacting an isocyanate group-containing compound (a1) with a polyfunctional polyether polyol (b1) and the polyol (b3).

(1) Isocyanate Group-Containing Compound (a1):

The isocyanate group-containing compound (a1) used for obtaining the above isocyanate group-terminated prepolymers is a compound having an isocyanate group in the molecule, and examples thereof may include aliphatic isocyanates having 2 to 18 carbon atoms (the number of carbon atoms excluding the carbon atoms in the isocyanate group; the same shall apply hereinafter), alicyclic isocyanates having 4 to 15 carbon atoms, aromatic isocyanates having 6 to 20 carbon atoms, and aromatic aliphatic isocyanates having 8 to 15 carbon atoms.

Compounds obtained by subjecting a part or all of isocyanate groups in a series of these isocyanates to modification such as isocyanurate modification, biuret modification, allophanate modification, urethodione modification, urethone imine modification, carbodiimide modification, oxazolidone modification, amide modification or imide modification may also be mentioned.

Examples of the aliphatic isocyanates having 2 to 18 carbon atoms may include ethylene diisocyanate, tetramethylene diisocyanate, hexamethylene diisocyanate, dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate and 2-isocyanatoethyl-2,6-diisocyanatohexanoate.

Examples of the alicyclic isocyanates having 4 to 15 carbon atoms may include isophorone diisocyanate, dicyclohexylmethane diisocyanate, cyclohexylene diisocyanate, methylcyclohexylene diisocyanate and bis(2-isocyanatoethyl)-4-cyclohexene-1,2-dicarboxylate.

Examples of the aromatic isocyanates having 6 to 20 carbon atoms may include 2,4-toluene diisocyanate, 2,6-toluene diisocyanate, diphenylmethane diisocyanate (4,4'-diphenylmethane diisocyanate, 2,4'-diphenylmethane diisocyanate, 2,2'-diphenylmethane diisocyanate and mixtures thereof; hereinafter abbreviated as "MDI"), naphthalene diisocyanate and polymethylenepolyphenyl polyisocyanates having 3 or more benzene rings.

Examples of the aromatic aliphatic isocyanates may include xylylene diisocyanate, $\alpha,\alpha,\alpha',\alpha'$-tetramethylxylylene diisocyanate and diisocyanatoethylbenzene.

In the present invention, a compound obtained by subjecting the aromatic isocyanate or a part of the aromatic isocyanate to any of a series of the aforementioned modifications is preferably used as the isocyanate group-containing compound (a1). In particular, a compound obtained by subjecting MDI or a part of MDI to any of a series of the aforementioned modifications is more preferably used. Of these, a compound obtained by subjecting MDI or a part of MDI to carbodiimide modification is particularly preferably used from the viewpoints of, for example, permitting the formation of a cured resin excellent in the working environment at molding and good in physical properties (e.g., mechanical strength such as hardness) required of sealing materials.

(2) Polyfunctional Polyether Polyol (b1):

The polyfunctional polyether polyol (b1) used for obtaining the above isocyanate group-terminated prepolymer can be obtained by using a compound having a functional group number of 8 as an initiator and adding an alkylene oxide thereto.

As the "compound having a functional group number of 8" to be used as an initiator, sucrose may be mentioned.

As the "alkylene oxide" to be added, alkylene oxides having 2 to 4 carbon atoms, such as ethylene oxide, propylene oxide and butylene oxide, may be mentioned. Of these, propylene oxide is particularly preferred from the viewpoint of permitting the formation of a cured resin extremely small in the amount of substance eluted into water (a sealing material extremely excellent in low eluted substance property).

In molecular weight distribution of the polyfunctional polyether polyol (b1) in terms of polypropylene polyol measured by GPC, a main peak having a peak top in the region of a molecular weight of 600 to 900 and accounting for 75 PA % or more of total peak area is present.

In the molecular weight distribution of the polyfunctional polyether polyol (b1), the peak top molecular weight of the main peak is usually from 600 to 900, preferably from 630 to 870. When the peak top molecular weight is less than 600, a cured resin (sealing material) formed from the resultant composition is too hard and thus cracks and the like are apt to occur after molding.

On the other hand, when the peak top molecular weight is more than 900, a cured resin formed from the resultant composition does not have a sufficient hardness under a high-temperature environment.

Moreover, in the molecular weight distribution of the polyfunctional polyether polyol (b1), the ratio of the main peak to the total peak area is usually 75 PA % or more, preferably 85 PA % or more. In the case where the ratio of the main peak is less than 75 PA %, the amount of substance eluted into water cannot be sufficiently suppressed when a cured resin (sealing material) formed from the resultant composition is immersed in the water (see Comparative Examples 2 to 4 to be mentioned below).

Furthermore, in the molecular weight distribution of the polyfunctional polyether polyol (b1), a ratio (Mw/Mn) of weight-average molecular weight (Mw) to number-average molecular weight (Mn) is usually 1.3 or less, preferably 1.2 or less, more preferably 1.1 or less. When the ratio (Mw/Mn) is more than 1.3, the amount of substance eluted into water cannot be sufficiently suppressed when a cured resin (sealing material) formed from the resultant composition is immersed in the water.

The number-average molecular weight (Mn) of the overall polyfunctional polyether polyol (b1) in terms of polypropylene polyol is preferably 400 to 700, more preferably 450 to 650.

The hydroxyl value (measured value) of the polyfunctional polyether polyol (b1) is preferably 350 to 650 mg KOH/g, more preferably 400 to 600 mg KOH/g.

In the reaction for obtaining the isocyanate group-terminated prepolymer [I], an equivalent ratio (isocyanate group/active hydrogen group) of the isocyanate group contained in the isocyanate group-containing compound (a1) to the active hydrogen group contained in the polyfunctional polyether polyol (b1) is usually 1.1 to 130.0, preferably 3.0 to 90.0, more preferably 5.0 to 80.0. By controlling the equivalent ratio (isocyanate group/active hydrogen group) to 5.0 to 80.0, a composition particularly excellent in the molding and processing ability at the formation of a sealing material (at the formation of a hollow-fiber membrane module) can be obtained. Incidentally, the reaction for obtaining the isocyanate group-terminated prepolymer [I] is a urethane forming reaction conventionally conducted.

The isocyanate group content in the isocyanate group-terminated prepolymer [I] is usually 8 to 30% by mass, preferably 10 to 28% by mass, more preferably 13 to 26% by mass. By using an isocyanate group-terminated prepolymer [I] having an isocyanate group content of 13 to 26% by mass, a composition particularly excellent in the molding and processing ability at the formation of a sealing material (at the formation of a hollow-fiber membrane module) can be obtained.

(3) Polyol (b3):

In the isocyanate group-terminated prepolymer [II], the polyol (b3) other than the polyfunctional polyether polyol (b1) is used together with the polyfunctional polyether polyol (b1).

By using the isocyanate group-terminated prepolymer [II] obtained by the use of the polyol (b3) in combination, the molding and processing ability at the formation of a sealing material (at the formation of a hollow-fiber membrane module) can be improved.

Examples of the "polyol (b3)" may include low-molecular weight polyols, polyether-based polyols (excluding polyfunctional polyether polyols (b1)), polyester-based polyols, polylactone-based polyols, castor oil-based polyols and polyolefin-based polyols. These compounds may be used either singly or as a combination of two or more thereof.

Examples of the "low-molecular weight polyols" include dihydric polyols (low-molecular weight glycol) such as ethylene glycol, diethylene glycol, propylene glycol, 1,2-, 1,3- or 1,4-butanediol, 1,5-pentanediol, 3-methyl-1,5-pentanediol, 1,6-hexane glycol, 1,8-octanediol, 1,10-decanediol, neopentyl glycol and hydrogenated bisphenol A; and trihydric to octahydric polyols such as glycerol, trimethylolpropane, hexanetriol, pentaerythritol, sorbitol and sucrose.

The molecular weight of the low-molecular weight polyol is usually 50 to 200.

Examples of the "polyether-based polyols (excluding polyfunctional polyether polyols (b1))" include polymers obtained by using any of the above-mentioned low-molecular weight polyols as an initiator and adding an alkylene oxide (for example, an alkylene oxide having 2 to 4 carbon atoms, such as ethylene oxide, propylene oxide or butylene oxide) thereto. Specific examples thereof include polypropylene glycol, polyethylene glycol, polyoxy tetramethylene ether glycol and chipped ethers that are copolymers of ethylene oxide and propylene oxide.

The molecular weight of the polyether-based polyol is usually 200 to 7,000, preferably 500 to 5,000. By using a polyether-based polyol having a molecular weight of 500 to 5,000, a composition particularly excellent in the molding and processing ability at the formation of a sealing material (at the formation of a hollow-fiber membrane module) can be obtained.

Examples of the "polyester-based polyols" include polyols obtained by condensation polymerization of a polycarboxylic acid (an aliphatic saturated or unsaturated polycarboxylic acid, azelaic acid, dodecanoic acid, maleic acid, fumaric acid, itaconic acid, ricinolic acid, a linoleic acid dimer and/or an aromatic polycarboxylic acid, for example, phthalic acid, isophthalic acid or terephthalic acid) with a polyol (the above-mentioned low-molecular weight polyol and/or polyether polyol).

The molecular weight of the polyester-based polyol is usually 200 to 5,000, preferably 500 to 3,000. By using a polyester-based polyol having a molecular weight of 500 to 3,000, a composition particularly excellent in the molding and processing ability at the formation of a sealing material (at the formation of a hollow-fiber membrane module) can be obtained.

Examples of the "polylactone-based polyols" include polyols obtained by addition polymerization of an initiator such as a glycol or triol with δ-caprolactone, α-methyl-ϵ-caprolactone or ϵ-methyl-ϵ-caprolactone or the like and/or β-methyl-ϵ-valerolactone or the like in the presence of a catalyst such as an organometallic compound, a metal chelate compound or a fatty acid metal acyl compound.

The molecular weight of the polylactone-based polyol is usually 200 to 5,000, preferably 500 to 3,000. By using a polylactone-based polyol having a molecular weight of 500 to 3,000, a composition particularly excellent in the molding and processing ability at the formation of a sealing material (at the formation of a hollow-fiber membrane module) can be obtained.

Examples of the "castor oil-based polyols" include castor oil (triglyceride of castor oil fatty acid); linear or branched polyesters obtained by a reaction of a castor oil fatty acid with a polyol (the above-mentioned low-molecular weight polyol and/or polyether polyol), for example, diglycerides and monoglycerides of castor oil fatty acids, mono-, di- or tri-esters of castor oil fatty acids with a trimethylolalkane, and mono-, di- or tri-esters of castor oil fatty acids with polypropylene glycol.

The molecular weight of the castor oil-based polyol is usually 300 to 4,000, preferably 500 to 3,000. By the use of a castor oil-based polyol having a molecular weight of 500 to 3,000, a composition particularly excellent in the molding and processing ability at the formation of a sealing material (at the formation of a hollow-fiber membrane module) can be obtained.

Examples of the "polyolefin-based polyols" include polybutadiene-based polyols obtained by introducing a hydroxyl group into a terminal of polybutadiene or a copolymer of butadiene and styrene or acrylonitrile.

Besides the above, polyether ester-based polyols obtained by an addition reaction of a polyester having a carboxyl group and/or an OH group at its terminal with an alkylene oxide, for example, ethylene oxide or propylene oxide may be mentioned.

Among the aforementioned polyols, polyester-based polyols and castor oil-based polyols are preferred. Of these, castor oil-based polyols are particularly preferred. In particular, a compound corresponding to the castor oil-modified polyol (b2) used as an essential ingredient for the curing agent (B) is preferred as the polyol (b3).

According to a composition obtained by the use of a castor oil-based polyol, particularly, the castor oil-modified polyol (b2) as the polyol (b3), a cured resin excellent in the working environment at molding and good in physical properties required of sealing materials can be formed, and moreover improvements in the productivity of a sealing material and further in the productivity of hollow-fiber membrane modules (filter devices) can also be made.

The hydroxyl value of the polyol (b3) is preferably 20 to 1,500 mg KOH/g, more preferably 100 to 1,300 mg KOH/g. By the use of the polyol (b3) having a hydroxyl value of 100 to 1,300 mg KOH/g, an isocyanate group-terminated prepolymer [II] having a viscosity suitable for working as the main agent is obtained. At the same time, according to the resultant composition, a cured resin (sealing material) excellent in heat resistance can be formed.

A mass ratio [(b1)/(b3)] of the polyfunctional polyether polyol (b1) to the polyol (b3) used for obtaining the isocyanate group-terminated prepolymer [II] is preferably 1/99 to 99/1, more preferably 5/95 to 80/20, particularly preferably 10/90 to 60/40.

By controlling the mass ratio [(b1)/(b3)] to 10/90 to 60/40, an isocyanate group-terminated prepolymer [II] having a viscosity suitable for working as the main agent can be obtained.

At the same time, according to the resultant composition, a cured resin (sealing material) excellent in heat resistance can be formed.

In the reaction for obtaining the isocyanate group-terminated prepolymer [II], an equivalent ratio (isocyanate group/active hydrogen group) of the isocyanate group contained in the isocyanate group-containing compound (a1) to the active hydrogen group contained in the polyfunctional polyether polyol (b1) and the polyol (b3) is usually 1.1 to 130.0, preferably 3.0 to 90.0, more preferably 5.0 to 80.0. By controlling the equivalent ratio (isocyanate group/active hydrogen group) to 5.0 to 80.0, a composition particularly excellent in the molding and processing ability at the formation of a sealing material (at the formation of a hollow-fiber membrane module) is obtained. Incidentally, the reaction for obtaining the isocyanate group-terminated prepolymer [II] is a urethane forming reaction conventionally conducted.

The isocyanate group content in the isocyanate group-terminated prepolymer [II] is usually 8 to 25% by mass, preferably 10 to 24% by mass, more preferably 13 to 23% by mass. By the use of an isocyanate group-terminated prepolymer [II] having an isocyanate group content of 13 to 23% by mass, a composition particularly excellent in the molding and processing ability at the formation of a sealing material (at the formation of a hollow-fiber membrane module) is obtained.

<Isocyanate Group-Terminated Prepolymer>

The isocyanate group-terminated prepolymer [I] and/or isocyanate group-terminated prepolymer [II] obtained by the use of the polyfunctional polyether polyol (b1) is contained as the isocyanate component constituting the main agent (A), whereby the composition of the invention has a long pot life and a reaction at curing moderately proceeds. Accordingly, such a composition can also be applied to the production of large-sized hollow-fiber membrane modules (hollow-fiber membrane type filter devices) constituting an industrial water treatment apparatus.

In addition, a cured resin (sealing material) formed from the composition of the invention is low in the temperature dependence of hardness (little in change of hardness by the temperature in a wide temperature range). Furthermore, a hollow-fiber membrane module (hollow-fiber membrane type filter devices) produced by the use of the composition is also low in the temperature dependence of filtration flow rate (change of flow rate by the temperature) and the temperature dependency of fractionation performance of the hollow-fiber membranes (change of fractionation performance by the temperature).

In the case where an isocyanate group-terminated prepolymer obtained by the use of no polyfunctional polyether polyol (b1) is used as the main agent, a cured resin low in the temperature dependency of hardness cannot be formed even when the curing agent (B) containing the castor oil-modified polyol (b2) is used (see Comparative Example 1 which will be described below).

In the composition of the invention, the polyfunctional polyether polyol (b1) is used as a raw material for obtaining the isocyanate group-terminated prepolymer constituting the main agent (A), so that a cured resin extremely small in the amount of substance eluted into water when immersed in the water (extremely excellent in low eluted substance property and having non-staining property) can be formed. Accordingly, the amount of the polyfunctional polyether polyol (b1) introduced can be increased. As a result, the temperature dependence of hardness in a cured resin (sealing material) formed from the resultant composition can be surely lowered.

According to a composition using the polyfunctional polyether polyol (b1) only as a component of the curing agent, the temperature dependence of hardness in a cured resin to be formed cannot be sufficiently lowered, and the amount of substance eluted into water when the cured resin formed is immersed in the water cannot be controlled.

<Curing Agent (B)>

The curing agent (B) in the composition of the invention contains, as a polyol component, a castor oil-modified polyol (b2) obtained from castor oil and/or a castor oil fatty acid and a trimethylolalkane.

(1) Castor Oil-Modified Polyol (b2):

The castor oil-modified polyol (b2) is a modified product (trimethylolalkane-modified product of castor oil and/or trimethylolalkane-modified product of castor oil fatty acid) obtained from castor oil and/or a castor oil fatty acid and a trimethylolalkane.

The castor oil-modified polyol (b2) can be obtained by a transesterification reaction of castor oil and a trimethylolalkane; or an esterification reaction of a castor oil fatty acid and a trimethylolalkane.

A main component of "castor oil" is a triglyceride of ricinolic acid, and "castor oil" includes hydrogenated castor oil.

On the other hand, a main component of "castor oil fatty acid" is ricinolic acid, and "castor oil fatty acid" includes hydrogenated castor oil fatty acid.

Examples of the "trimethylolalkane" may include trimethylolmethane, trimethylolethane, trimethylolpropane, trimethylolbutane, trimethylolpentane, trimethylolhexane, trimethylolheptane, trimethyloloctane, trimethylolnonane and trimethyloldecane.

The number-average molecular weight of the castor oil-modified polyol (b2) is preferably 150 to 2,000, more preferably 300 to 1,200. According to a composition obtained by the use of a castor oil-modified polyol (b2) having a number-average molecular weight of 300 to 1,200, a cured resin good in physical properties (particularly, mechanical properties) required of sealing materials can be formed.

The average hydroxyl value of the castor oil-modified polyol (b2) is preferably 80 to 1,600 mg KOH/g, more preferably 120 to 600 mg KOH/g, particularly preferably 300 to 400 mg KOH/g.

According to a composition obtained by the use of a castor oil-modified polyol (b2) having an average hydroxyl value of 120 to 600 mg KOH/g, a cured resin good in physical properties (particularly, mechanical properties) required of sealing materials can be formed.

In particular, according to a composition obtained by the use of a castor oil-modified polyol (b2) having an average hydroxyl value of 300 to 400 mg KOH/g, a cured resin good in physical properties required of sealing materials can be formed, and moreover, the productivity of a sealing material and further the productivity of a hollow-fiber membrane module (filter device) can also be improved.

The castor oil-modified polyol (b2) is preferably such that, in the case where the number-average molecular weight (Mn) of a castor oil fatty acid monoester of a trimethylolalkane as determined by GPC measurement is regarded as 450, an area ratio of the peak, whose number-average molecular weight (Mn) is 450 or more as determined by the GPC measurement, is 85 PA % or more and a ratio (Mw/Mn) of the weight-average molecular weight (Mw) to the number-average molecular weight (Mn) is 1.5 or less. According to a composition of the present invention obtained by the use of a castor oil-modified polyol (b2) satisfying these conditions, a cured resin (sealing material) extremely small in the amount of substance eluted into water when immersed in the water can be formed. Incidentally, in the GPC measurement, a calibration curve obtained from trifunctional polypropylene polyol was used.

The amount (degree) of the eluted substance is measured by a testing method for eluted substance in accordance with "Test of Aqueous Injection Containers" in "Testing Method for Drug Containers made of Plastic" prescribed in The Japanese Pharmacopoeia, and is indicated by the use of, as an index value, a difference in an amount of potassium permanganate consumed between a test liquid and a blank test liquid. In the invention, the difference is preferably 1.0 mL or less, more preferably 0.7 mL or less, particularly preferably 0.5 mL or less.

A cured resin (sealing material) formed from the composition of the invention containing the castor oil-modified polyol (b2) as the polyol component constituting the curing agent (B) is particularly excellent in adhesion property and heat resistance. Thereby, the adhesive force to a housing can be retained at a high level even when a sealing material (preferably, a membrane sealing material used in hollow-fiber membrane modules or flat membrane modules) composed of the cured resin is bonded to the housing and then subjected to a steam sterilization treatment. Moreover, it is possible to use the sealing material for a long period of time even under a high temperature. Furthermore, the hollow-fiber membrane module (hollow-fiber membrane type filter device) produced by the use of the composition is also low in the temperature dependence of filtration flow rate (change of flow rate by the temperature) and the temperature dependency of fractionation performance of the hollow-fiber membranes (change of fractionation performance by the temperature).

A cured resin (sealing material) formed from a composition obtained by the use of a curing agent containing no castor oil-modified polyol (b2) together with the above main agent (A) is high in the temperature dependence of hardness and poor in adhesion property and heat resistance (see Comparative Example 5 which will be described below).

(2) Active Hydrogen Group-Containing Compound:

In the invention, an active hydrogen group-containing compound (hereinafter referred to as "active hydrogen group-containing compound (b4)") other than the castor oil-modified polyol (b2) may be contained in the curing agent (B).

Examples of the active hydrogen group-containing compound (b4) may include polyols such as low-molecular weight polyols, polyether-based polyols, polyester-based polyols, polylactone-based polyols, castor oil-based polyols (excluding castor oil-modified polyols (b2)) and polyolefin-based polyols. These polyols may be used either singly or as a combination of two or more thereof.

Specific examples thereof may include the same compounds as the compounds exemplified as the "polyol (b3)" used for obtaining the isocyanate group-terminated prepolymer [II]. However, the polyfunctional polyether polyol (b1) is further included in the "polyether-based polyols" used as the active hydrogen group-containing compound (b4).

Examples of the active hydrogen group-containing compound (b4) may also include amine compounds such as low-molecular weight polyamines and low-molecular weight aminoalcohols (for example, propylene oxide or ethylene oxide adducts of amino compounds such as ethylenediamine, such as N,N,N',N'-tetrakis[2-hydroxypropyl]ethylenediamine and N,N,N',N'-tetrakis[2-hydroxyethyl]ethylenediamine that are oxyalkylated derivatives of the amino compounds; mono-, di- and triethanolamines; and N-methyl-N, N-diethanolamine).

The proportion [(b2)/(b4)] of the castor oil-modified polyol (b2) to the active hydrogen group-containing compound (b4) contained in the curing agent (B) is preferably 1/99 to 100/0, particularly preferably 100/0.

<Mixing Proportion of Main Agent (A) to Curing Agent (B)>

In the composition of the invention, a mixing proportion of the main agent (A) to the curing agent (B) is such a proportion that a molar ratio (isocyanate group/active hydrogen group) of the isocyanate group contained in the isocyanate component (isocyanate group-terminated prepolymer [I] and/or isocyanate group-terminated prepolymer [II]) constituting the main agent (A) to the active hydrogen group contained in the polyol component (essential castor oil-modified polyol (b2) and optional active hydrogen group-containing compound (b4)) constituting the curing agent (B) amounts to preferably 0.8 to 1.6, more preferably 0.9 to 1.2, particularly preferably 1.0 to 1.1. According to a composition obtained in such a mixing proportion, a cured resin (sealing material) excellent in durability and extremely small in the amount of substance eluted into water can be formed.

Incidentally, the composition of the invention may contain a known urethane forming catalyst.

Examples of the urethane forming catalyst may include metallic compound-based catalysts such as organotin compounds; and tertiary amine catalyst such as triethylenediamine (TEDA), tetramethylhexamethylenediamine (TMHMDA), pentamethyldiethylenetriamine (PMDETA), dimethylcyclohexylamine (DMCHA) and bisdimethylaminoethyl ether (BDMAEA).

<Sealing Material and Hollow-Fiber Membrane Module>

The sealing material of the invention is obtained by curing the composition of the invention.

Specifically, the composition of the invention comprising the main agent (A) and the curing agent (B) is prepared at room temperature, and then the sealing material can be suitably formed by reacting and curing the isocyanate component constituting the main agent (A) and the polyol component constituting the curing agent (B) under a temperature condition of 0° C. to 100° C., preferably 30° C. to 80° C., more preferably 30° C. to 60° C.

Incidentally, as needed, each of the main agent (A) and the curing agent (B) may be heated to 30 to 60° C. before mixing them for the purpose of shortening a gelling time and lowering the viscosity of the resultant composition.

The sealing material of the invention can be applied to large-sized hollow-fiber membrane modules because it is obtained from the composition of the invention having a long pot life.

The sealing material of the invention is excellent in adhesion property, so that high adhesive force is gained between the sealing material and a housing base material of a filter device, and moreover, an end portion of a bundle of a plurality of hollow-fiber membranes can be strongly bound.

The sealing material of the invention is excellent in heat resistance, so that the adhesive force can be retained at a high level even when it is subjected to a steam sterilization treatment in a state bonded to an adherend such as a housing. For example, even when the sealing material bonded to a housing made of a polycarbonate resin is subjected to the steam sterilization treatment for 20 minutes under an atmosphere of 121° C., the retention of adhesive strength is 70% or more, preferably 85% or more, more preferably 90% or more, particularly preferably 95% or more, and thus the sealing material can sufficiently possess heat resistance required of sealing materials.

The sealing material of the invention has hardness suitable as a sealing material [Shore D hardness of 30 to 85 (25° C.)]

and is low in the temperature dependence of hardness, so that sealing performance can be surely secured in a wide temperature range.

Even when the sealing material of the invention is brought into contact with water, an amount of substance eluted into the water is extremely small.

The sealing material of the invention is not broken even when it is pressurized repeatedly about 50,000 times under a condition of 50° C., and thus sufficiently possesses durability required of sealing materials.

Such excellent various performance properties are sufficiently developed even in the case of the sealing material obtained from the composition having a long pot life (composition of the invention). Accordingly, the hollow-fiber membrane module (hollow-fiber membrane type filter device) obtained by sealing gaps between hollow-fiber membranes at an end portion of a bundle of a plurality of hollow-fiber membranes with the sealing material obtained by curing the composition of the invention has such excellent durability as sufficiently withstands continuous use for a long period of time.

In addition, since the composition of the invention has a long pot life, extremely stable productivity can be achieved even in hollow-fiber membrane modules (hollow-fiber membrane type filter devices) that have tended to be enlarged in recent years.

The hollow-fiber membrane module of the invention is obtained by sealing gaps between hollow-fiber membranes at an end portion of a bundle of a plurality of the hollow-fiber membranes with the sealing material obtained by curing the composition of the invention.

The hollow-fiber membrane module of the invention can be produced by sealing gaps between hollow-fiber membranes at an end portion of a bundle of a plurality of the hollow-fiber membranes with the composition of the invention, curing the composition to form the sealing material of the invention (thereby, the gaps between hollow-fiber membranes is sealed with the sealing material), and accommodating the bundle into a housing.

As a specific structure of the hollow-fiber membrane module (hollow-fiber membrane type filter device) of the invention, the structure described in JP-A-11-5023 may be mentioned but the structure is not limited thereto.

EXAMPLES

The following will describe the present invention more specifically with reference to the following Examples and Comparative Examples. However, the invention is not to be construed as being limited by these examples.

Production Example 1

Production of Main Agent (A)

The inside of a 2 L-sized four-necked flask equipped with a thermometer, a stirrer, a nitrogen sealing tube and a condenser tube was purged with nitrogen. This flask was charged with 233 g of 4,4'-MDI "Millionate MT (trade name)" (manufactured by Nippon Polyurethane Industry Co., Ltd.) and 591 g of a carbodiimide-modified product "Millionate MTL-C (trade name)" (manufactured by Nippon Polyurethane Industry Co., Ltd., isocyanate group content=28.6% by mass) of 4,4'-MDI, and then temperature elevation and stirring of the resultant liquid mixture were started. At the time when the temperature of the liquid mixture reached 50° C., 105 g of the following polyol (b31) and 71 g of the following polyol (b11) were added, and the whole was stirred and mixed at 70° C. under a nitrogen atmosphere over a period of 3 hours, thereby conducting a reaction to obtain an isocyanate group-terminated prepolymer [II] constituting a main agent (A). This prepolymer will hereinafter be referred to as "Main Agent (A-1)". The isocyanate group content in Main Agent (A-1) was 21.0% by mass, and the viscosity at 25° C. was 3,400 mPa·s.

Production Example 2

Production of Main Agent (A)

The inside of a 2 L-sized four-necked flask equipped with a thermometer, a stirrer, a nitrogen sealing tube and a condenser tube was purged with nitrogen. This flask was charged with 234 g of 4,4'-MDI "Millionate MT (trade name)" and 596 g of a carbodiimide-modified product "Millionate MTL-C (trade name)" of 4,4'-MDI, and then temperature elevation and stirring of the resultant liquid mixture were started. At the time when the temperature of the liquid mixture reached 50° C., 136 g of the following polyol (b21) and 34 g of the following polyol (b11) were added, and the whole was stirred and mixed at 70° C. under a nitrogen atmosphere over a period of 3 hours, thereby conducting a reaction to obtain an isocyanate group-terminated prepolymer [II] constituting a main agent (A). This prepolymer will hereinafter be referred to as "Main Agent (A-2)". The isocyanate group content in Main Agent (A-2) was 21.0% by mass, and the viscosity at 25° C. was 1,900 mPa·s.

Production Example 3

Production of Main Agent (A)

The inside of a 2 L-sized four-necked flask equipped with a thermometer, a stirrer, a nitrogen sealing tube and a condenser tube was purged with nitrogen. This flask was charged with 236 g of 4,4'-MDI "Millionate MT (trade name)" and 602 g of a carbodiimide-modified product "Millionate MTL-C (trade name)" of 4,4'-MDI, and then temperature elevation and stirring of the resultant liquid mixture were started. At the time when the temperature of the liquid mixture reached 50° C., 97 g of the following polyol (b21) and 65 g of the following polyol (b11) were added, and the whole was stirred and mixed at 70° C. under a nitrogen atmosphere over a period of 3 hours, thereby conducting a reaction to obtain an isocyanate group-terminated prepolymer [II] constituting a main agent (A). This prepolymer will hereinafter be referred to as "Main Agent (A-3)". The isocyanate group content in Main Agent (A-3) was 21.0% by mass, and the viscosity at 25° C. was 3,200 mPa·s.

Production Example 4

Production of Main Agent (A)

The inside of a 2 L-sized four-necked flask equipped with a thermometer, a stirrer, a nitrogen sealing tube and a condenser tube was purged with nitrogen. This flask was charged with 239 g of 4,4'-MDI "Millionate MT (trade name)" and 607 g of a carbodiimide-modified product "Millionate MTL-C (trade name)" of 4,4'-MDI, and then temperature elevation and stirring of the resultant liquid mixture were started. At the time when the temperature of the liquid mixture reached 50° C., 62 g of the following polyol (b21) and 92 g of the following polyol (b11) were added, and the whole was stirred and mixed at 70° C. under a nitrogen atmosphere over a period of 3 hours, thereby conducting a reaction to obtain an isocyanate group-terminated prepolymer [II] constituting a main agent (A). This prepolymer will hereinafter be referred to as "Main Agent (A-4)". The isocyanate group content in Main Agent (A-4) was 21.0% by mass, and the viscosity at 25° C. was 5,600 mPa·s.

Production Example 5

Production of Main Agent (A)

The inside of a 2 L-sized four-necked flask equipped with a thermometer, a stirrer, a nitrogen sealing tube and a condenser tube was purged with nitrogen. This flask was charged with 163 g of 4,4'-MDI "Millionate MT (trade name)" and 735 g of a carbodiimide-modified product "Millionate MTL-C (trade name)" of 4,4'-MDI, and then temperature elevation and stirring of the resultant liquid mixture were started. At the time when the temperature of the liquid mixture reached 50° C., 102 g of the following polyol (b11) was added, and the whole was stirred and mixed at 70° C. under a nitrogen atmosphere over a period of 3 hours, thereby conducting a reaction to obtain an isocyanate group-terminated prepolymer [I] constituting a main agent (A). This prepolymer will hereinafter be referred to as "Main Agent (A-5)". The isocyanate group content in Main Agent (A-5) was 23.5% by mass, and the viscosity at 25° C. was 2,200 mPa·s.

Production Example 6

Production of Main Agent (Comparative)

The inside of a 2 L-sized four-necked flask equipped with a thermometer, a stirrer, a nitrogen sealing tube and a condenser tube was purged with nitrogen. This flask was charged with 100 g of 4,4'-MDI "Millionate MT (trade name)" and 650 g of a carbodiimide-modified product "Millionate MTL-C (trade name)" of 4,4'-MDI, and then temperature elevation and stirring of the resultant liquid mixture were started. At the time when the temperature of the liquid mixture reached 50° C., 250 g of the following polyol (b31) was added, and the whole was stirred and mixed at 70° C. under a nitrogen atmosphere over a period of 3 hours, thereby conducting a reaction to obtain an isocyanate group-terminated prepolymer constituting a comparative main agent. This prepolymer will hereinafter be referred to as "Main Agent (A-6)". The isocyanate group content in Main Agent (A-6) was 19.0% by mass, and the viscosity at 25° C. was 1,700 mPa·s.

Production Example 7

Production of Main Agent (Comparative)

The inside of a 2 L-sized four-necked flask equipped with a thermometer, a stirrer, a nitrogen sealing tube and a condenser tube was purged with nitrogen. This flask was charged with 233 g of 4,4'-MDI "Millionate MT (trade name)" and 591 g of a carbodiimide-modified product "Millionate MTL-C (trade name)" of 4,4'-MDI, and then temperature elevation and stirring of the resultant liquid mixture were started. At the time when the temperature of the liquid mixture reached 50° C., 105 g of the following polyol (b31) and 71 g of the following polyol (b12) were added, and the whole was stirred and mixed at 70° C. under a nitrogen atmosphere over a period of 3 hours, thereby conducting a reaction to obtain an isocyanate group-terminated prepolymer constituting a comparative main agent. This prepolymer will hereinafter be referred to as "Main Agent (A-7)". The isocyanate group content in Main Agent (A-7) was 21.0% by mass, and the viscosity at 25° C. was 2,100 mPa·s.

Production Example 8

Production of Main Agent (Comparative)

The inside of a 2 L-sized four-necked flask equipped with a thermometer, a stirrer, a nitrogen sealing tube and a condenser tube was purged with nitrogen. This flask was charged with 236 g of 4,4'-MDI "Millionate MT (trade name)" and 602 g of a carbodiimide-modified product "Millionate MTL-C (trade name)" of 4,4'-MDI, and then temperature elevation and stirring of the resultant liquid mixture were started. At the time when the temperature of the liquid mixture reached 50° C., 97 g of the following polyol (b21) and 65 g of the following polyol (b12) were added, and the whole was stirred and mixed at 70° C. under a nitrogen atmosphere over a period of 3 hours, thereby conducting a reaction to obtain an isocyanate group-terminated prepolymer constituting a comparative main agent. This prepolymer will hereinafter be referred to as "Main Agent (A-8)". The isocyanate group content in Main Agent (A-8) was 21.0% by mass, and the viscosity at 25° C. was 2,300 mPa·s.

Production Example 9

Production of Main Agent (Comparative)

The inside of a 2 L-sized four-necked flask equipped with a thermometer, a stirrer, a nitrogen sealing tube and a condenser tube was purged with nitrogen. This flask was charged with 163 g of 4,4'-MDI "Millionate MT (trade name)" and 735 g of a carbodiimide-modified product "Millionate MTL-C (trade name)" of 4,4'-MDI, and then temperature elevation and stirring of the resultant liquid mixture were started. At the time when the temperature of the liquid mixture reached 50° C., 102 g of the following polyol (b12) was added, and the whole was stirred and mixed at 70° C. under a nitrogen atmosphere over a period of 3 hours, thereby conducting a reaction to obtain an isocyanate group-terminated prepolymer constituting a comparative main agent. This prepolymer will hereinafter be referred to as "Main Agent (A-9)". The isocyanate group content in Main Agent (A-9) was 23.5% by mass, and the viscosity at 25° C. was 1,700 mPa·s.

Preparation Example 1

Preparation of Curing Agent (B)

A curing agent (B) composed of the polyol (b21) was provided (100 parts by mass). This agent will hereinafter be referred to as "Curing Agent (B-1)".

Preparation Example 2

Preparation of Curing Agent (Comparative)

Comparative Curing Agent (B-2) was prepared by mixing 80 parts by mass of the polyol (b31) and 20 parts by mass of the polyol (b32).

The polyols used for obtaining the above-described main agents and the polyols used as curing agents are as follows.

[Polyol (b11)]

A polyfunctional polyether polyol obtained by adding propylene oxide using sucrose (functional group number=8.0) as an initiator, trade name "Excenol EL-455S" (manufactured by Asahi Glass Co., Ltd.).

For the polyol (b11), molecular weight distribution in terms of polypropylene polyol was measured by GPC (molecular weight distribution is shown in FIG. 1). Moreover, from the molecular weight distribution, the peak top molecular weight, area ratio, number-average molecular weight (Mn), weight-average molecular weight (Mw), and ratio (Mw/Mn) of the main peak, and the number-average molecular weight (Mn) of the overall polyol (b11) were determined. The results are shown below.

Peak top molecular weight of main peak: 788
Area ratio of main peak: 89.1 PA %
Number-average molecular weight (Mn) of main peak: 790
Weight-average molecular weight (Mw) of main peak: 798
Ratio (Mw/Mn) of main peak: 1.010
Overall number-average molecular weight (Mn): 619

[Polyol (b12)]

A polyfunctional polyether polyol obtained by adding propylene oxide using sucrose (functional group number=8.0) as an initiator, trade name "Adeka Polyether SC-1000" (manufactured by Asahi Denka Kogyo K.K.).

For the polyol (b12), molecular weight in terms of polypropylene polyol was measured by GPC (molecular weight distribution is shown in FIG. 2). Moreover, from the molecular weight distribution, the peak top molecular weight, area ratio, number-average molecular weight (Mn), weight-average molecular weight (Mw), and ratio (Mw/Mn) of the main peak, and the number-average molecular weight (Mn) of the overall polyol (b12) were determined. The results are shown below.

Peak top molecular weight of main peak: 803
Area ratio of main peak: 60.2 PA %
Number-average molecular weight (Mn) of main peak: 811
Weight-average molecular weight (Mw) of main peak: 846
Ratio (Mw/Mn) of main peak: 1.043
Overall number-average molecular weight (Mn): 534

[Polyol (b21)] (Corresponding to Castor Oil-Modified Polyol (b2)):

A trimethylolpropane-modified product "#1297X (trade name)" (manufactured by Itoh Oil Mfg. Co., Ltd.) of castor oil: average functional group number=3.0; hydroxyl value=340 mg KOH/g; GPC measured values when the number-average molecular weight (Mn) of a castor oil fatty acid monoester of a trimethylolalkane is regarded as 450: area ratio of the peak whose Mn is 450 or more=88 PA %; and the ratio (Mw/Mn)=1.42.

[Polyol (b31)]:

Castor oil "URIC H-30 (trade name)" (manufactured by Itoh Oil Mfg. Co., Ltd.): average functional group number=2.7; hydroxyl value=160 mg KOH/g; GPC measured values when the number-average molecular weight (Mn) of a castor oil fatty acid monoester of a trimethylolalkane is regarded as 450: area ratio of the peak whose Mn is 450 or more=99 PA %; and the ratio (Mw/Mn)=1.03.

[Polyol (b32)]:

N,N,N',N'-tetrakis[2-hydroxypropyl]-ethylenediamine: average functional group number=4.0 and hydroxyl value=760 mg KOH/g.

The conditions for measuring GPC on the polyol (b11), the polyol (b12), the polyol (b21) and the polyol (b31) are as follows.

[Measuring Conditions]

(1) Measuring apparatus: "HLC-8120 (trade name)" (manufactured by Tosoh Corporation).
(2) Column: four columns were connected, wherein every two columns were packed with "TSKgel G2000HXL (trade name)" and "TSKgel G3000HXL (trade name)" (both, manufactured by Tosoh Corporation) as packing agents, respectively.
(3) Column temperature: 40° C.
(4) Detector: RI (refractive index) meter.
(5) Eluate: tetrahydrofuran (THF) (flow rate: 1 mL/min., 40° C.)
(6) Calibration curve: Trifunctional polypropylene polyols of the following trade names (all, manufactured by Sanyo Chemical Industries, Ltd.) were used to obtain a calibration curve.

"SANNIX GP-250" (number-average molecular weight=250)
"SANNIX GP-400" (number-average molecular weight=400)
"SANNIX GP-600" (number-average molecular weight=600)
"SANNIX GP-1000" (number-average molecular weight=1,000)
"SANNIX GP-3000" (number-average molecular weight=3,000)
"SANNIX GP-4000" (number-average molecular weight=4,000)
"SANNIX GP-5000" (number-average molecular weight=5,000).

(7) Sample solution: 10 ml of a THF solution of 0.05 g of a sample.

Additionally, the conditions for measuring GPC on the polyol (b21) and the polyol (b31) are as follows.

[Measuring Method]

With respect to a castor oil fatty acid monoester of a trimethylolalkane, its peak area ratio, weight-average molecular weight (Mw) and number-average molecular weight (Mn) were first determined from a chart obtained by detecting refractive index differences by the use of the calibration curve obtained from the trifunctional polypropylene polyols.

With respect to each sample prepared, its peak area ratio, weight-average molecular weight (Mw) and number-average molecular weight (Mn) in the case where number-average molecular weight (Mn) of the first measured castor oil fatty acid monoester of the trimethylolalkane was regarded as 450 were then determined from a chart obtained by detecting refractive index differences based on the same calibration curve, and the ratio (Mw/Mn) was further calculated out based on these values.

Examples 1 to 5, Comparative Examples 1 to 5

A main agent and a curing agent were mixed in accordance with their combinations shown in Table 1 and Table 2 so as to give a ratio (molar ratio) of isocyanate group/active hydrogen group of 1.00 at a liquid temperature of 35° C., thereby obtaining respective polyurethane resin forming compositions.

<Evaluation of Polyurethane Resin Forming Composition (Cured Product)>

[Hardness Measurement of Cured Product]

After each of the polyurethane resin forming compositions according to Examples 1 to 5 and Comparative Examples 1 to 5 was defoamed under reduced pressure (for 3 minutes at 10 to 20 kPa), it was charged into a stainless steel mold (100 mm×10 mm×8 mm). It was allowed to stand at 25° C. for 7 days to cure the composition, which was then released from the mold to obtain a cured product (cured resin).

With respect to each of the thus-obtained cured products, its Shore D hardness was measured under respective temperature conditions of 10° C., 25° C. and 70° C. Results of the measurement and hardness ratios (hardness at 70° C./hardness at 25° C.) are shown in Table 1 and Table 2.

[Adhesion Property to Housing]

After each of the polyurethane resin forming compositions according to Examples 1 to 5 and Comparative Examples 1 to 5 was defoamed under reduced pressure (for 3 minutes at 10 to 20 kPa), it was charged into a housing (44 mm×10 mm) made of polycarbonate (forming a layer of the composition on the housing) and allowed to stand at 25° C. for 7 days to cure the composition, thereby producing a specimen with a cured product (layer) formed on the housing. With respect to each of the thus-obtained specimens, adhesive strength $C_0$ (=peeling force/adhesion area) of the cured product to the housing was measured.

After each of the resultant specimens was subjected to a steam sterilization treatment (121° C. for 20 minutes), adhesive strength C was measured in the same manner as described above.

The initial adhesive strength $C_0$, adhesive strength C after the steam sterilization treatment and adhesive strength retention ($C/C_0$) are shown in Table 1 and Table 2.

[Eluted Substance Test]

After each of the polyurethane resin forming compositions of Examples 1 to 5 and Comparative Examples 1 to 5 was defoamed under reduced pressure (for 3 minutes at 10 to 20 kPa), it was charged onto a release paper (forming a layer of the composition on the release paper) so as to give a thickness of about 1 to 2 mm and allowed to stand at 25° C. for 7 days to cure the composition, and the release paper was then peeled off to obtain a cured product.

With respect to each of the thus-obtained cured products, an amount (an index value indicated by a difference in the amount of potassium permanganate consumed between a test liquid and a blank test liquid) of eluted substance was measured by an eluted substance testing method in accordance with "Test of Aqueous Injection Containers" in "Testing Method for Plastic Drug Containers" prescribed in The Japanese Pharmacopoeia.

Specifically, each of the resultant cured products was finely cut, immersed in water and subjected to a high-pressure steam sterilization treatment at 121° C. for 1 hour, thereby obtaining a test liquid.

On the other hand, a liquid (i.e., water alone), in which no cured product was immersed as a blank, was subjected to the same treatment, thereby obtaining a blank test liquid. With respect to both liquids, amounts of potassium permanganate consumed were measured to determine a difference in the amount consumed between both liquids. This difference is an index value of the amount of the eluted substance, and the amount of the eluted substance comes to be little as this value decreases. The differences (index values) in the amount consumed are shown in Table 1 and Table 2.

[Fractionation Performance as Water Purifier]

After each of the polyurethane resin forming compositions of Examples 1 to 5 and Comparative Examples 1 to 5 was defoamed under reduced pressure (for 3 minutes at 10 to 20 kPa), the composition was used to produce a columnar water purifier (length of a hollow-fiber part: 600 mm; diameter of casing sections at both ends: 50 mm) comprising a hollow-fiber membrane module produced by sealing gaps between hollow-fiber membranes at an end portion of a bundle of a plurality of the hollow-fiber membranes with a sealing material obtained by curing the composition.

This water purifier was used to filter a liquid to be treated, which was obtained by dispersing polystyrene latex particles having a predetermined particle diameter in a 0.1% by mass solution of a surfactant (polyethylene glycol-p-isooctyl phenyl ether), and a concentration of the latex particles in the resultant filtrate was measured at a wavelength of 320 nm by means of a Hitachi spectrophotometer (U-3400) to determine a particle size at a trapping rate of 90%, thereby evaluating variation of the fraction particle size. The results are shown in Table 1 and Table 2.

[Pot Life of Polyurethane Resin Forming Composition]

After each of the polyurethane resin forming compositions (total of the main agent and the curing agent: 100 g) of Examples 1 to 5 and Comparative Examples 1 to 5 was defoamed under reduced pressure (for 3 minutes at 10 to 20 kPa), an increase in viscosity was traced by means of a rotary viscometer (B type, No. 4 rotor) under an atmosphere of 25° C., the period from the point of time when the mixing of the main agent and the curing agent was started up to the time when the viscosity of the composition reached 50,000 mPas being regarded as a pot life. The results are shown in Table 1 and Table 2.

TABLE 1

|  |  |  | Example 1 | Example 2 | Example 3 | Example 4 | Example 5 |
|---|---|---|---|---|---|---|---|
| Main agent (A) | | | A-1 | A-2 | A-3 | A-4 | A-5 |
| Curing agent (B) | | | B-1 | B-1 | B-1 | B-1 | B-1 |
| NCO/OH (molar ratio) | | | 1.00 | 1.00 | 1.00 | 1.00 | 1.00 |
| Hardness 10 sec value (Shore D) | Measuring temperature | 10° C. | 83 | 81 | 82 | 82 | 80 |
| | | 25° C. (1) | 80 | 81 | 82 | 82 | 80 |
| | | 70° C. (2) | 70 | 72 | 75 | 77 | 70 |
| Hardness ratio ((2)/(1)) | | | 0.88 | 0.89 | 0.91 | 0.94 | 0.88 |
| Adhesive strength to housing (MPa) | Initial strength ($C_0$) | | 24.3 | 24.0 | 24.3 | 24.3 | 24.3 |
| | After sterilization (C) | | 23.7 | 23.3 | 23.7 | 23.8 | 23.7 |
| Adhesive strength retention ($C/C_0$) (%) | | | 97.5 | 97.1 | 97.5 | 97.9 | 97.5 |
| Difference in amount of $KMnO_4$ consumed (mL) | | | 0.4 | 0.4 | 0.4 | 0.4 | 0.4 |
| Filtration flow rate(L/min) | Measuring temperature | 10° C. | 90 | 90 | 90 | 90 | 90 |
| | | 25° C. | 90 | 90 | 90 | 90 | 90 |
| | | 70° C. | 86 | 86 | 86 | 86 | 86 |
| Fraction particle size (μm) | Measuring temperature | 10° C. | 0.23 | 0.23 | 0.23 | 0.23 | 0.23 |
| | | 25° C. | 0.23 | 0.23 | 0.23 | 0.23 | 0.23 |
| | | 70° C. | 0.23 | 0.23 | 0.23 | 0.23 | 0.23 |
| Pot life (min) | | | 18 | 17 | 17 | 16 | 15 |

TABLE 2

| | | | Compara. Example 1 | Compara. Example 2 | Compara. Example 3 | Compara. Example 4 | Compara. Example 5 |
|---|---|---|---|---|---|---|---|
| Main agent (A) | | | A-6 | A-7 | A-8 | A-9 | A-1 |
| Curing agent (B) | | | B-1 | B-1 | B-1 | B-1 | B-2 |
| NCO/OH (molar ratio) | | | 1.00 | 1.00 | 1.00 | 1.00 | 1.00 |
| Hardness 10 | Measuring | 10° C. | 81 | 83 | 82 | 80 | 77 |
| sec value | temperature | 25° C. (1) | 81 | 80 | 82 | 80 | 75 |
| (Shore D) | | 70° C. (2) | 43 | 65 | 66 | 69 | 42 |
| Hardness ratio ((2)/(1)) | | | 0.53 | 0.81 | 0.82 | 0.86 | 0.56 |
| Adhesive | Initial strength ($C_0$) | | 23.5 | 24.3 | 24.5 | 24.8 | 23.0 |
| strength to housing [MPa] | After sterilization (C) | | 22.7 | 22.7 | 22.9 | 23.2 | 17.1 |
| Adhesive strength retention ($C/C_0$) [%] | | | 96.6 | 93.4 | 93.5 | 93.5 | 73.9 |
| Difference in amount of $KMnO_4$ consumed [mL] | | | 0.4 | 1.1 | 1.0 | 1.4 | 0.4 |
| Filtration flow | Measuring | 10° C. | 90 | 90 | 90 | 90 | 90 |
| rate [L/min] | temperature | 25° C. | 90 | 90 | 90 | 90 | 90 |
| | | 70° C. | 84 | 84 | 85 | 86 | 86 |
| Fraction | Measuring | 10° C. | 0.23 | 0.23 | 0.23 | 0.23 | 0.23 |
| particle size | temperature | 25° C. | 0.23 | 0.23 | 0.23 | 0.23 | 0.23 |
| [μm] | | 70° C. | 0.19 | 0.20 | 0.21 | 0.23 | 0.21 |
| Pot life [min] | | | 20 | 18 | 17 | 17 | 4 |

Example 7

The polyurethane resin forming composition according to Example 1 was used to seal gaps between hollow-fiber membranes at both end portions of a bundle of 9,000 polysulfone hollow-fiber membranes and between a cartridge case (inner diameter: 15.4 cm, made of PVC) containing the bundle inserted therein and the bundle by a centrifugal bonding at 35° C. for 90 minutes, and this cartridge case was allowed to stand for a week at an atmosphere of 25° C.

As above, the cartridge case containing the bundle of the hollow-fiber membranes inserted therein was detachably accommodated into a housing through the sealing material to produce a hollow-fiber membrane module as a filter device. Using the hollow-fiber membrane module, a filtration operation and back-pressure filtration of water at a temperature of 50° C. were repeated 50,000 cycles under a maximum water pressure of 200 kPa. However, the sealing material portion and the hollow-fiber membranes were not broken.

Example 8

The polyurethane resin forming composition according to Example 2 was used to seal gaps between hollow-fiber membranes at both end portions of a bundle of 22,000 polysulfone hollow-fiber membranes and between a cartridge case (inner diameter: 22.1 cm, made of polycarbonate) containing the bundle inserted therein and the bundle by a centrifugal bonding at 35° C. for 90 minutes, and this cartridge case was allowed to stand for a week at an atmosphere of 25° C.

As above, the cartridge case containing the bundle of the hollow-fiber membranes inserted therein was detachably accommodated into a housing through the sealing material to produce a hollow-fiber membrane module as a large-sized filter device. Using the hollow-fiber membrane module, a filtration operation and back pressure filtration of water at a temperature of 50° C. were repeated 50,000 cycles under a maximum water pressure of 200 kPa in the same manner as in Example 7. However, the sealing material portion and the hollow-fiber membranes were not broken.

As shown in Table 1, the polyurethane resin forming compositions according to Examples 1 to 5 all have a long pot life, and the cured products (polyurethane resins) of these compositions are all low in the temperature dependence of hardness (little in change of hardness), high in the retention (C/C0) of adhesive strength to a housing base material even when they are subjected to a steam sterilization treatment for a long period of time at a high temperature, extremely small in the amount of substance eluted into water (non-staining property in water) and good in fractionation performance.

On the other hand, as shown in Table 2, the cured product of the composition of Comparative Example 1 using the main agent obtained by the use of the polyol (b31) composed of castor oil was high in the temperature dependence of hardness.

The cured products of the compositions according to Comparative Examples 2 to 4 using the main agent obtained by the use of the comparative polyol (b12) were large in the amount of substance eluted into water.

The cured products of the compositions according to Comparative Example 5 using the comparative curing agent (B-2) has a short pot life and the cured product was high in the temperature dependence of hardness and also low in the retention ($C/C_0$) of adhesive strength.

Moreover, the hollow-fiber membrane module according to Example 7 produced by the use of the composition (composition of the invention) according to Example 1 is particularly excellent in durability against repeated pressurization.

Furthermore, the composition (composition of the invention) according to Example 2 can be surely applied to the production of large-sized modules such as the hollow-fiber membrane module according to Example 8. Moreover, the hollow-fiber membrane module according to Example 8 has excellent durability against repeated pressurization.

INDUSTRIAL APPLICABILITY

As described above, the cured products (sealing materials) of the polyurethane resin forming compositions according to the invention have many excellent performance properties, in particular, excellent low eluted substance property. Accordingly, the cured products can be suitably used as sealing materials (binding materials) for hollow-fiber membrane modules (hollow-fiber membrane type filter devices) constituting medical and industrial separating apparatus, and particularly suitably used as sealing materials for large-sized hollow-fiber membrane modules. Specific examples of the medical and industrial separating apparatus include plasma separators, artificial lungs, artificial kidneys, artificial livers, and household and industrial water treatment apparatus.

Moreover, the cured products of the polyurethane resin forming compositions of the invention are excellent in various physical properties, for example, hardness, tensile strength and adhesion property, so that they may also be used as various kinds of industrial sealing materials, for example, electrical, automotive, building and civil engineering sealing materials or cushioning materials, and as compositions for obtaining industrial rolls for paper making, iron manufacture, printing or the like or OA instrument parts such as paper feeding rolls.

Figure 1:
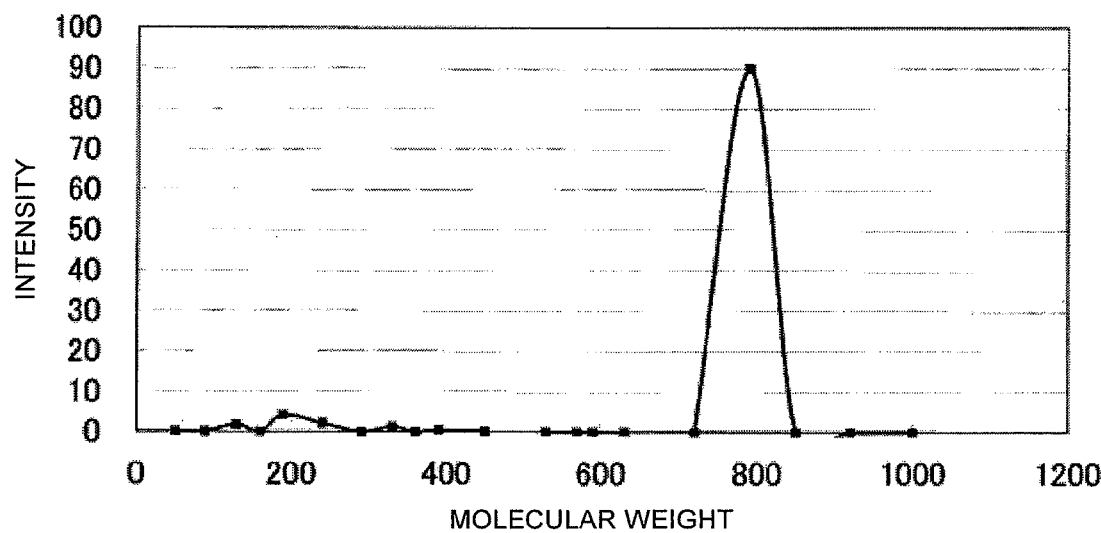
FIG. 1 is a chart showing molecular weight distribution in terms of polypropylene polyol in the polyol (b11) for the invention.
Figure 2:
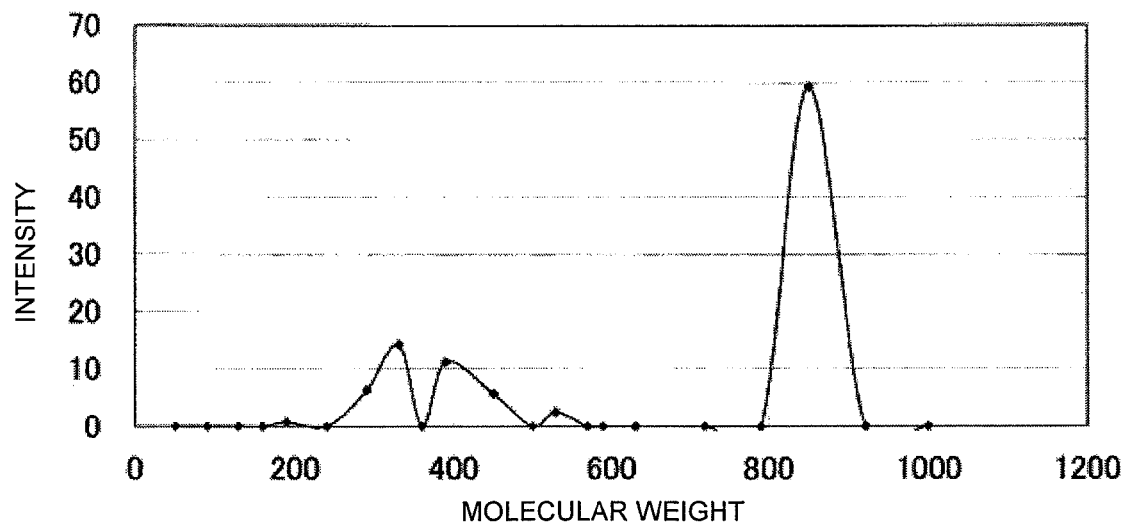
FIG. 2 is a chart showing molecular weight distribution in terms of polypropylene polyol in the polyol (b12) for comparison.

The invention claimed is:

1. A polyurethane resin forming composition comprising a main agent (A) containing an isocyanate component and a curing agent (B) containing a polyol component;
   which contains, as the isocyanate component constituting the main agent (A), an isocyanate group-terminated prepolymer obtained by reacting
   an isocyanate group-containing compound (a1) with
   a polyfunctional polyether polyol (b1) which is obtained by the use of a compound having a functional group number of 8 as an initiator and wherein, in molecular weight distribution in terms of polypropylene polyol measured by gel permeation chromatography (GPC), a main peak having a peak top in the region of a molecular weight of 600 to 900 and accounting for 75% or more of total peak area is present and a ratio (Mw/Mn) of weight-average molecular weight (Mw) to number-average molecular weight (Mn) is 1.3 or less; and
   which contains, as the polyol component constituting the curing agent (B), a castor oil-modified polyol (b2) obtained from castor oil and/or a castor oil fatty acid and a trimethylolalkane.

2. A polyurethane resin forming composition comprising a main agent (A) containing an isocyanate component and a curing agent (B) containing a polyol component;
   which contains, as the isocyanate component constituting the main agent (A), an isocyanate group-terminated prepolymer obtained by reacting
   an isocyanate group-containing compound (a1) with
   a polyfunctional polyether polyol (b1) which is obtained by the use of a compound having a functional group number of 8 as an initiator and wherein, in molecular weight distribution in terms of polypropylene polyol measured by gel permeation chromatography (GPC), a main peak having a peak top in the region of a molecular weight of 600 to 900 and accounting for 75% or more of total peak area is present and a ratio (Mw/Mn) of weight-average molecular weight (Mw) to number-average molecular weight (Mn) is 1.3 or less and
   a polyol (b3) other than the polyfunctional polyether polyol (b1); and
   which contains, as the polyol component constituting the curing agent (B), a castor oil-modified polyol (b2) obtained from castor oil and/or a castor oil fatty acid and a trimethylolalkane.

3. A polyurethane resin forming composition comprising a main agent (A) containing an isocyanate component and a curing agent (B) containing a polyol component;
   which contains, as the isocyanate component constituting the main agent (A), an isocyanate group-terminated prepolymer obtained by reacting
   an isocyanate group-containing compound (a1) with
   a polyfunctional polyether polyol (b1) which is obtained by the use of a compound having a functional group number of 8 as an initiator and wherein, in a molecular weight distribution in terms of polypropylene polyol measured by gel permeation chromatography (GPC), a main peak having a peak top in the region of a molecular weight of 600 to 900 and accounting for 75% or more of total peak area is present and a ratio (Mw/Mn) of weight-average molecular weight (Mw) to number-average molecular weight (Mn) is 1.3 or less and
   a castor oil-modified polyol (b2) obtained from castor oil and/or a castor oil fatty acid and a trimethylolalkane; and
   which contains, as the polyol component constituting the curing agent (B), a castor oil-modified polyol (b2) obtained from castor oil and/or a castor oil fatty acid and a trimethylolalkane.

4. The polyurethane resin forming composition according to any one of claims 1 to 3, wherein the isocyanate group-containing compound (a1) is obtained by subjecting diphenylmethane diisocyanate or a part thereof to carbodiimide modification.

5. The polyurethane resin forming composition according to any one of claims 1 to 3, wherein the polyfunctional polyether polyol (b1) is obtained by adding propylene oxide using sucrose as an initiator.

6. The polyurethane resin forming composition according to any one of claims 1 to 3, wherein a main peak having a peak top accounting for 85% or more of the total peak area is present in molecular weight distribution of the polyfunctional polyether polyol (b1).

7. A sealing material obtained by curing the polyurethane resin forming composition according to any one of claims 1 to 3.

8. A sealing material for a hollow-fiber membrane module, which is obtained by curing the polyurethane resin forming composition according to any one of claims 1 to 3.

9. A hollow-fiber membrane module, wherein gaps between hollow-fiber membranes at an end portion of a bundle of a plurality of the hollow-fiber membranes are sealed with the sealing material according to claim 8.

* * * * *